United States Patent
Koelle et al.

(10) Patent No.: US 6,378,306 B2
(45) Date of Patent: Apr. 30, 2002

(54) DEVICE FOR LIMITING THE SPEED OF AN EXHAUST-GAS TURBOCHARGER

(75) Inventors: Ulrich Koelle, Schwieberdingen; Armin Lussman, Stuttgart, both of (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/785,683

(22) Filed: Feb. 16, 2001

(30) Foreign Application Priority Data

Feb. 16, 2000 (DE) .......................................... 100 07 013

(51) Int. Cl.$^7$ .............................................. F02B 33/44
(52) U.S. Cl. ........................ 60/605.1; 60/605.2; 60/611; 123/564
(58) Field of Search ............................ 60/605.1, 605.2, 60/611; 123/559.1, 564

(56) References Cited

U.S. PATENT DOCUMENTS 4,757,686 A * 7/1988 Kawamura et al. ........... 60/608
4,774,811 A * 10/1988 Kawamura ................... 60/608
5,307,783 A * 5/1994 Satoya et al. ........... 123/564 X
6,000,384 A * 12/1999 Brown et al. ................ 123/676

FOREIGN PATENT DOCUMENTS

GB           2 043 167        10/1980

OTHER PUBLICATIONS

"MTZ Motortechnische Zeitschrift" mentioned in a specification.[Motor Engineering Journal] 53 (1992), 10, pp. 454–462.

* cited by examiner

*Primary Examiner*—Hoang Nguyen
(74) *Attorney, Agent, or Firm*—Kenyon & Kenyon

(57) ABSTRACT

A device for limiting the supercharger speed which makes do without a speed sensor or an atmospheric pressure sensor has a bandpass filter which filters out a spectral component from the output signal of a boost pressure sensor arranged in the induction pipe of the engine, the spectral component appearing in the signal spectrum of the boost pressure sensor when the air column in the induction pipe is set into a vibration which develops when the compressor of the turbocharger rotates at the maximum permissible speed.

3 Claims, 1 Drawing Sheet

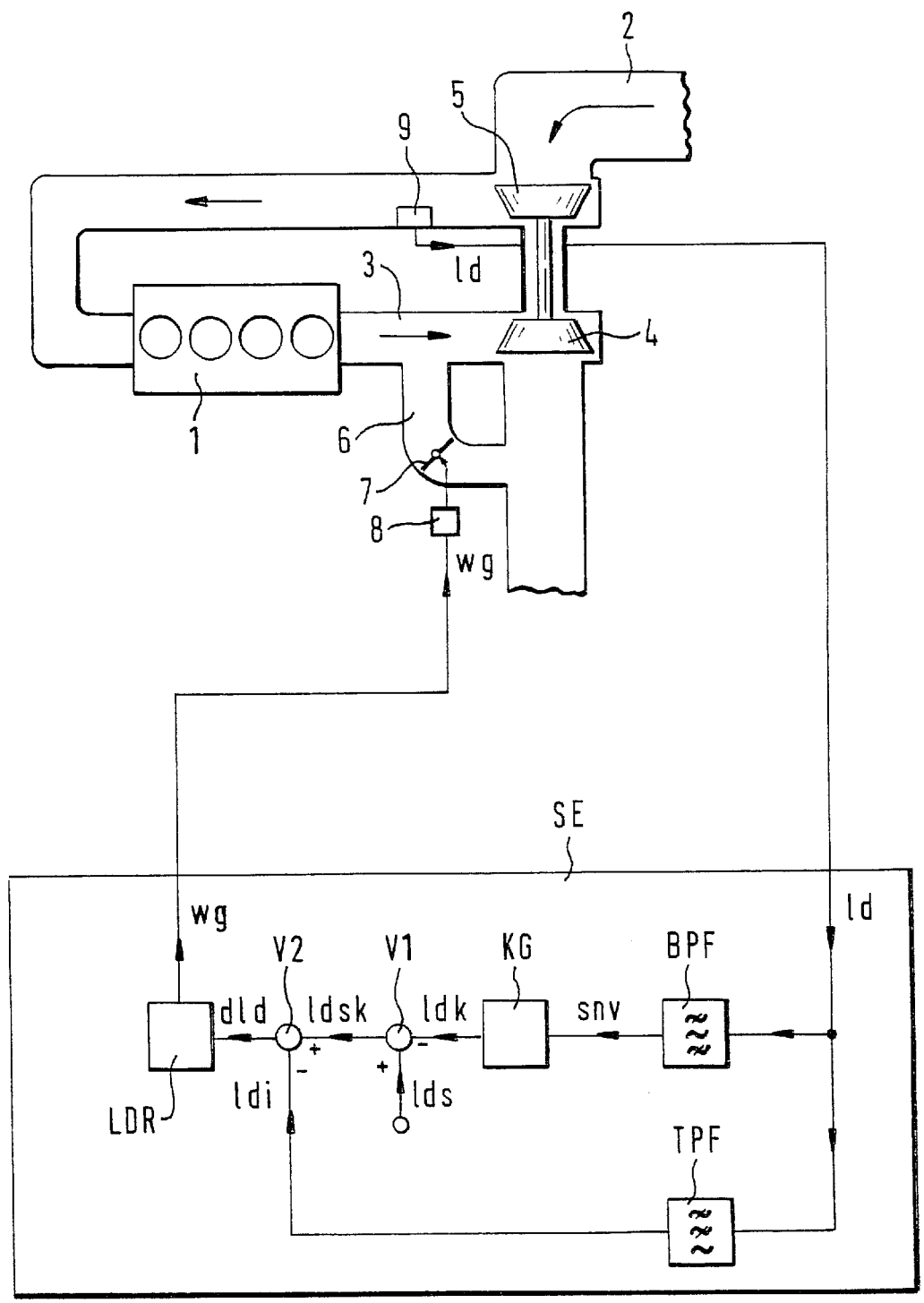

DEVICE FOR LIMITING THE SPEED OF AN EXHAUST-GAS TURBOCHARGER

FIELD OF THE INVENTION

The present invention relates to a device for limiting the speed of an exhaust-gas turbocharger of an internal combustion engine, a pressure sensor measuring the boost pressure (supercharging pressure) on the pressure side of a compressor of the turbocharger arranged in the induction pipe of the engine, and provision being made for means which reduce a preselected setpoint boost pressure when the speed (rotational speed) reaches a maximum permissible value.

BACKGROUND INFORMATION

When designing an exhaust-gas turbocharger and its control, care must be taken that the supercharger speed does not exceed a maximum permissible value. As can be gathered from "MTZ Motortechnische Zeitschrift" [Motor Engineering Journal] 53 (1992), 10, pages 454–462, the boost pressure is controlled in a known manner by comparing a setpoint boost pressure resulting from the driver's command to an actual boost pressure measured by a boost pressure sensor in the induction pipe. For monitoring the supercharger speed, usually a speed sensor is used which detects the speed of the compressor in the induction pipe. By comparing the measured supercharger speed to a threshold value which corresponds to maximum permissible speed value, it can determine whether the turbocharger reaches a critical speed range and act upon the boost pressure control correspondingly. From the mentioned MTZ it follows that the boost pressure in the induction pipe is always adjusted to programmed values which were determined in standard atmosphere. With increasing altitude and, consequently, dropping pressure, therefore with decreasing air density, the demanded setpoint boost pressure is only attained by increasing the supercharger speed. To this end, the wastegate of the turbocharger is closed to a greater degree and, consequently, the turbine is charged with a larger quantity of exhaust gas. Using an atmospheric pressure sensor, the setpoint boost pressure preselected by the boost pressure control can be lowered in the case of dropping ambient pressure, thereby also allowing the supercharger speed to be limited below its maximum permissible value.

An object of the present invention is to provide a device for limiting the speed of an exhaust-gas turbocharger, the device neither requiring a speed sensor for the supercharger speed nor an atmospheric pressure sensor.

SUMMARY OF THE INVENTION

The mentioned objective is achieved by providing a bandpass filter which filters out a spectral component from the output signal of a boost pressure sensor existing in the induction pipe, the spectral component appearing in the signal spectrum of the boost pressure sensor when the air column in the induction pipe is set into a vibration which develops when the compressor of the turbocharger rotates at the maximum permissible speed. Here, a criterion for limiting the supercharger speed below its maximum permissible value is derived from the output signal of a boost pressure sensor which exists anyway. In this context, a speed sensor and an atmospheric pressure sensor can be dispensed with.

Accordingly, a correcting element exists which compares the spectral component delivered by the bandpass filter to a threshold value and, in the case that the threshold value is exceeded, generates a correction signal which reduces the preselected setpoint boost pressure.

The boost pressure sensor is expediently a piezoelectric sensor since a piezoelectric element responds to vibrations of the air column in the induction pipe in a very sensitive manner.

BRIEF DESCRIPTION OF THE DRAWINGS

The FIGURE shows a schematic representation of an internal combustion engine having an exhaust-gas turbocharger and a control unit limiting the supercharger speed.

DETAILED DESCRIPTION

The FIGURE shows an internal combustion engine 1 having an induction pipe 2 and an exhaust duct 3. In exhaust duct 3, a turbine 4 of a turbocharger is located which is mechanically coupled to a compressor 5 arranged in induction pipe 2. To be able to control the boost pressure in the induction pipe, turbine 4 in exhaust duct 3 is bridged by a bypass 6 accommodating a controllable valve 7. Valve 7 is driven by an actuator 8. On the pressure side of compressor 5 in induction pipe 2, a boost pressure sensor 9 is located whose output signal ld is fed to a control unit SE. Boost pressure signal ld is applied to the input of a low pass filter TPF at whose output a mean actual boost pressure ldi freed from all disturbances appears. A boost pressure controller LDR (e.g., a PD or PI or PID controller) derives a controlled variable wg for actuator 8 of wastegate 7 from the offset did between actual boost pressure ldi and a setpoint boost pressure lds which depends on the driver's command and, possibly, on other performance quantities of the engine.

As already explained by way of introduction, care must be taken that the turbocharger does not exceed a maximum permissible speed to prevent it from destruction. When operating the vehicle at higher altitudes, the maximum permissible supercharger speed can easily be exceeded since, with increasing altitude and, consequently, dropping ambient pressure, the demanded setpoint boost pressure is only attained by increasing the supercharger speed. In the case of an atmospheric pressure heavily dropping with respect to the standard atmosphere therefore, special care must be taken that the supercharger speed does not exceed the maximum permissible value to prevent the turbocharger from destruction. To this end, a bandpass filter BPF is provided in control unit SE, output signal ld of boost pressure sensor 9 being fed to the bandpass filter in parallel to low-pass filter TPF.

Boost pressure sensor 9 also detects vibrations in the air column in the induction pipe resulting from the rotational movement of compressor 5. The frequency of these vibrations depends on the speed of compressor 5; in particular, if boost pressure sensor 9 is a piezoelectric sensor it responds in a very sensitive manner to the vibrations of the air column in the induction pipe which are generated by the compressor. These vibrations manifest themselves in the form of high-frequency signal components which are superimposed upon sensor signal ld. With regard to its frequency passband, bandpass filter BPF is to be designed such that only those spectral components snv appear at its output which are due to vibrations of the air column in induction pipe 2 which develop when compressor 5 rotates at the maximum permissible speed.

Output signal snv of bandpass filter BPF is fed to a correcting element KG. This correcting element KG compares signal snv to a threshold value which is calculated such that when it is exceeded by spectral component snv filtered out from boost pressure signal ld, it can be reliably assumed that filtered out spectral component snv has been generated by a speed of compressor 5 reaching the maximum permissible value. So if correcting element KG detects the maximum permissible supercharger speed in this manner, it emits a correction signal ldk. In logic element V1, this correction signal ldk is subtracted from setpoint boost pressure lds.

In logic element V2, offset did between corrected, reduced setpoint boost pressure ldsk and actual boost pressure ldi is generated, the offset finally being fed to boost pressure controller LDR. The boost pressure controller then controls wastegate 7 in such a manner that a smaller quantity of exhaust gas is led via turbine 4 of the exhaust-gas turbocharger, thus reducing the speed of the exhaust-gas turbocharger below the maximum permissible value.

Using the described device, it is achieved, without using a supercharger speed sensor or an atmospheric pressure sensor, that the exhaust-gas turbocharger can indeed be run up to its maximum permissible speed without exceeding it even when traveling at high geographical altitudes.

What is claimed is:

1. A device for limiting a speed of an exhaust-gas turbocharger of an internal combustion engine, the turbocharger including a compressor, the device comprising:

a boost pressure sensor measuring a boost pressure on a pressure side of the compressor situated in an induction pipe of the engine, a spectral component appearing in an output signal of the boost pressure sensor when an air column in the induction pipe is set into a vibration which develops when the compressor rotates at a maximum permissible speed; and a pressure reducing arrangement for reducing a preselected setpoint boost pressure when a rotational speed reaches a maximum permissible value, the pressure reducing arrangement including a bandpass filter for filtering out the spectral component from the output signal of the boost pressure sensor.

2. The device according to claim 1, wherein the pressure reducing arrangement further includes a correcting element, the correcting element comparing the spectral component delivered by the bandpass filter to a threshold value and, if the threshold value is exceeded, the correcting element generating a correction signal which reduces the preselected setpoint boost pressure.

3. The device according to claim 1, wherein the boost pressure sensor is a piezoelectric sensor.

* * * * *